United States Patent [19]
Kroehnert

[11] Patent Number: 5,196,671
[45] Date of Patent: Mar. 23, 1993

[54] DEVICE AND PROCESS FOR THE LASER WELDING OF A TUBE

[75] Inventor: Gerhard Kroehnert, Todesfelde, Fed. Rep. of Germany

[73] Assignee: Siemens Aktiengesellschaft, Berlin and Munich, Fed. Rep. of Germany

[21] Appl. No.: 873,519

[22] Filed: Apr. 21, 1992

Related U.S. Application Data

[63] Continuation of Ser. No. 746,450, Aug. 16, 1991, abandoned.

[30] Foreign Application Priority Data

Aug. 17, 1990 [DE] Fed. Rep. of Germany ... 9011959[U]
May 13, 1991 [DE] Fed. Rep. of Germany ....... 4115561

[51] Int. Cl.$^5$ .............................................. B23K 26/00
[52] U.S. Cl. ........................... 219/121.63; 219/121.64; 219/121.74; 219/121.84
[58] Field of Search ..................... 219/121.74, 121.75, 219/121.63, 121.64, 121.82, 121.84; 376/260

[56] References Cited

U.S. PATENT DOCUMENTS

| | | | |
|---|---|---|---|
| 3,383,491 | 5/1968 | Muncheryan | 219/121 |
| 3,440,393 | 4/1969 | Henderson | 219/125 |
| 3,679,863 | 7/1972 | Houldcroft | 219/121 LM |
| 3,749,878 | 7/1973 | Sullivan | 219/121 L |
| 3,821,510 | 6/1974 | Muncheryan | 219/121 L |
| 4,088,865 | 5/1978 | Peters | 219/121 L |
| 4,128,753 | 12/1978 | Sharp | 219/121 L |
| 4,144,888 | 3/1979 | Malyshev et al. | 219/121.6 X |
| 4,160,894 | 7/1979 | Stemmler | 219/121 L |
| 4,167,662 | 9/1979 | Steen | 219/121 L |
| 4,367,017 | 1/1983 | Jimbou | 350/486 |
| 4,510,372 | 4/1985 | Kobuck | 219/125.11 |
| 4,514,614 | 4/1985 | Stol | 219/125.11 |
| 4,518,843 | 5/1985 | Antol | 219/121 LC |
| 4,564,736 | 1/1986 | Jones | 219/121 L |
| 4,574,180 | 3/1986 | Kasner | 219/121 LY |
| 4,694,136 | 9/1987 | Kasner | 219/121 LD |
| 4,694,137 | 9/1987 | Hawkins | 219/121 LC |
| 4,724,298 | 2/1988 | Hawkins | 219/121 LU |
| 4,827,098 | 5/1989 | Kasner | 219/121.63 |
| 4,839,495 | 6/1989 | Kitera et al. | 219/121.63 |
| 4,978,834 | 12/1990 | Griffaton | 219/121.63 |
| 4,983,796 | 1/1991 | Griffaton | 219/121.63 |
| 5,006,268 | 4/1991 | Griffaton | 219/121.63 |
| 5,066,846 | 11/1991 | Dirl | 219/121.63 |

FOREIGN PATENT DOCUMENTS

| | | |
|---|---|---|
| 0300458A1 | 1/1989 | European Pat. Off. . |
| 0364366A2 | 4/1990 | European Pat. Off. . |
| 0367648A1 | 5/1990 | European Pat. Off. . |
| 0408405A1 | 1/1991 | European Pat. Off. . |
| 3910098A1 | 10/1990 | Fed. Rep. of Germany . |
| 55-144391 | 11/1980 | Japan . |
| 56-14090 | 2/1981 | Japan . |
| 56-41091 | 4/1981 | Japan . |
| 56-74393 | 6/1981 | Japan . |
| 56-91992 | 7/1981 | Japan . |
| 57-44486 | 3/1982 | Japan . |
| 57-181789 | 11/1982 | Japan . |
| 59-50986 | 3/1984 | Japan . |
| 59-78791 | 5/1984 | Japan . |
| 59-191585 | 10/1984 | Japan . |
| 60-82284 | 5/1985 | Japan . |
| 60-251222 | 12/1985 | Japan . |
| 61-63387 | 4/1986 | Japan . |
| 62-93094 | 4/1987 | Japan . |

*Primary Examiner*—C. L. Albritton
*Attorney, Agent, or Firm*—Ira Lee Zebrak

[57] ABSTRACT

A device for the laser welding of a tube (14) along its inner circumference with a probe (1) that can be inserted in the tube (14) has within the probe (1) devices (73-76) with which a part of a stream of shield gas flowing within the interior of the probe is divided off before it reaches an outlet opening (45) for a focused and deflected laser beam (59) and is conducted to the outer surface of the probe (1) with an axial flow component directed toward the outlet opening (45). By this means, any precipitation of welding material in the vicinity of the outlet opening (45) and in the interior of the probe (1) is reduced.

39 Claims, 4 Drawing Sheets

DEVICE AND PROCESS FOR THE LASER WELDING OF A TUBE

CROSS-REFERENCE TO RELATED APPLICATION

This is a continuation of Ser. No. 07/746,450 filed Aug. 16, 1991 now abandoned.

This patent application is related to co-pending United States patent application entitled "DEVICE AND PROCESS FOR THE LASER WELDING OF A TUBE", filed on even date herewith, in the name of the same inventor as the present application, and assigned to the same assignee as the present application.

FIELD OF THE INVENTION

The present invention relates to a device and a process for the laser welding of a tube along an inner surface of the tube with a probe that can be inserted in the tube.

BACKGROUND INFORMATION

A process for the laser welding of a tube with a probe that can be inserted in the tube is known, for example, from EP-A1-0 300 458. The probe described is connected by means of an optical waveguide with an Nd:YAG solid-state laser. The laser beam that emerges from one end of the optical waveguide within the probe is focused on a focal point located outside the tube by means of a lens system consisting of several lenses and a deflecting mirror. The deflecting mirror is inclined at an angle of 45° to the longitudinal axis of the probe and deflects by 90° the laser beam that is focused by the lens system and extends within the probe between the lens system and the deflecting mirror. The deflected laser beam leaves the probe through a cylindrical outlet opening located radially in the housing of the probe.

The probe is also provided with a flow channel for a shield gas, which runs through the wall of the housing of the probe, opens into the outlet opening, and flows out into the space between the deflecting mirror and the welding area.

In this familiar device, the protective gas stream is thus split directly opposite the welding area into a partial gas stream directed into the interior of the probe and a partial gas stream directed toward the welding point. This leads to the creation of turbulence in the vicinity of the outlet opening, so that welding vapor, welding plasma, or—particularly when a pulsed laser is employed—drops released from the melt may rebound on the deflecting mirror and at the outlet opening, thus considerably reducing the useful life of the probe.

One purpose of the present invention is therefore to provide a device and a process for the laser welding of a tube along its inner surface with a probe that can be inserted in the tube, with which any precipitation of welding vapor on the deflecting mirror and in the vicinity of the outlet opening is reduced to a large extent.

SUMMARY OF THE INVENTION

The present invention is directed to a device for laser welding a tube, comprising a probe which can be inserted into the tube and including a) at least one optical element to focus and deflect a laser beam propagated within the probe, mainly along its longitudinal axis, b) an outlet opening, through which there emerges from the probe a laser beam deflected and focused by the at least one optical element, c) means mounted within the probe for conducting a stream of shield gas to the outlet opening, at least part of which flows out through the outlet opening, and d) means for dividing a part of the stream of shield gas extending within the probe before it reaches the outlet opening and conducting the divided stream of shield gas with an axial flow component directed toward the outlet opening, to the outer surface of the probe.

As a result, there is produced between the outer wall of the probe and the inner circumference of the tube an axially directed flow of shield gas, with which the welding material emerging from the welding melt is conducted rapidly out of the vicinity of the outlet opening in the direction of the head of the probe. This reduces the precipitation of welding vapor in the vicinity of the outlet opening and on the deflecting elements.

In a preferred embodiment of the present invention, means are provided within the probe for adjusting the quantitative ratio of the two partial gas streams, in particular, a reducing nozzle mounted in a flow channel for a partial gas stream.

In an advantageous design of the present invention, to guide the partial gas stream that has been deflected toward the outside, there is provided a sleeve surrounding the probe, which is provided on its inner surface with a circular groove, into which there opens a flow channel, running within the probe, for the partial gas stream. The sleeve is provided with axial holes which extend from the front surface of the sleeve, which faces the head of the probe, to the circular groove. This results in a particularly homogenous axial stream of shield gas into the space between the probe and the tube.

Any precipitation of vaporizing welding material on the deflecting mirror is further reduced in another design of the present invention by means for dividing off a partial gas stream at the outlet opening from a stream of gas propagated within the probe and which is conducted through channels lying within the probe.

In particular, it is provided that the channels open into a recess in the deflecting mirror, which is located directly opposite the outlet opening.

In another advantageous design of the present invention, there is provided an optical element which generates a deflected laser beam that is focused on a focal point lying outside the probe, the direction of whose propagation is oriented obliquely relative to the longitudinal axis. The element in question is an optical component with which the direction of propagation of a laser beam can be altered, for example, a plane mirror, a mirror with a curved surface, or a lens.

As a result of the oblique release of the deflected laser beam, there is no need for the outlet opening to be located directly opposite the welding area, so that the precipitation of welding vapor in the vicinity of the outlet opening and within the probe is reduced.

The angle of the deflected laser beam to the longitudinal axis of the probe is preferably between approximately 60° and 80°. This ensures that even when the outlet opening for the laser light is large, any reflection of the laser light into the interior of the probe is avoided for all practical purposes.

In one design of the present invention, a deflecting mirror with a flat reflecting surface is provided in the probe to deflect the focused laser beam, the normal to whose surface makes an angle with the longitudinal axis of the probe that is greater than 45° and preferably between approximately 50° and 60°.

In another embodiment of the present invention, a concave deflecting mirror is provided, which is used both to focus and to deflect the laser beam extending in the middle along the longitudinal axis of the probe. By this means, the cross section of the laser beam that impinges on the deflecting mirror is enlarged, compared with the embodiment with a flat deflecting mirror. The radiation intensity impinging on the deflecting mirror per surface unit is thereby reduced, and, accordingly, so is the local heating of the deflecting mirror.

In another embodiment of the present invention, to improve the deflecting properties of the deflecting system when a probe that is optically coupled with a laser by means of an optical waveguide is used, devices are provided between the end of the optical waveguide and the deflecting mirror to collimate the laser beam emerging from the optical waveguide.

Preferably, a deflecting mirror made of a material with high heat conductivity, such as copper (Cu), is provided. By this means, the thermal stress on the deflecting mirror is further reduced and the durability of the reflective layer is increased accordingly.

In a preferred embodiment of the present invention, an outlet opening is provided for release of the deflected laser beam from the probe, which gives an axially directed flow component to a stream of shield gas that flows out of the outlet opening.

The present invention is also directed to a process for the laser welding of a tube along its inner circumference having the following characteristics:

a) from a laser beam propagated within a probe that is inserted in the tube, mainly along the longitudinal axis of the probe, a laser beam is generated which is deflected and focused on a point on the inner circumference of the tube;

b) the laser beam emerges from the probe through an outlet opening;

c) a stream of shield gas is fed into the probe and flows within the probe in the direction of the outlet opening;

d) part of the stream of shield gas flows out through the outlet opening; and e) another part of the stream of shield gas is divided off before it reaches the outlet opening and is conducted with an axial flow component into the space between the tube and the probe.

An additional reduction of the precipitation of welding material on the deflecting mirror is achieved by the fact that from the shield gas flowing within the probe to the outlet opening, there is divided off within the probe at the outlet opening another partial stream of gas which flows within the probe.

In a preferred embodiment of the process of the present invention, the laser beam is deflected obliquely relative to the longitudinal axis of the probe.

In another advantageous embodiment of the process of the present invention, a solid-state laser operating in the cw mode is used, thus preventing any release of drops from the welding melt.

BRIEF DESCRIPTION OF THE DRAWINGS

For a more detailed explanation of the present invention, reference is made to the embodiments illustrated in the accompanying drawings.

DETAILED DESCRIPTION

Figure 1:
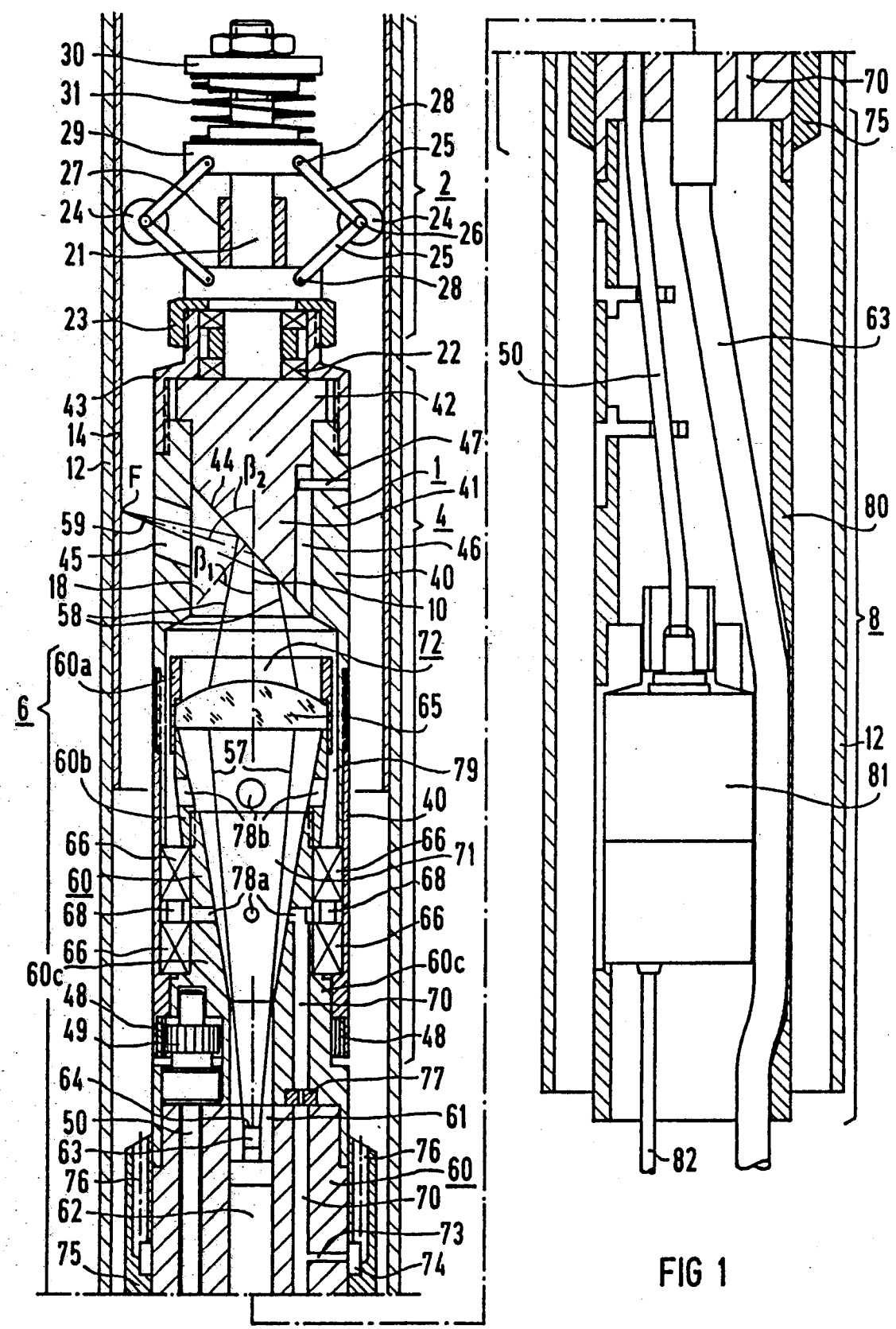
In FIG. 1, there is shown a longitudinal section of a probe according to the present invention which has been inserted in a tube for welding the tube.

According to FIG. 1, a probe 1 in accordance with one embodiment of the present invention comprises a centering unit 2, a deflecting unit 4, a focusing unit 6 and a drive unit 8, which are arranged one after the other along a longitudinal axis 10 of the probe 1. The probe 1 is inserted in the tube 12 that is to be processed and extends with its head, which includes the deflecting unit 4, into the interior of a sleeve tube 14 that is inserted in the tube 12 and is to be welded to the tube 12.

The centering unit 2 comprises a shaft 21, which is mounted on the head end of the probe 1 on ball bearings 22 so that it can rotate on the deflecting unit 4 and is held fast in the axial direction with a screw cap 23. The centering unit 2 contains at least three rolls 24, of which only two are shown in FIG. 1, and each of which is spring-mounted on a swivel gearing with two elements 25. The two elements 25 form the legs of an isoceles triangle and touch one another in a swivel joint 26 that receives the roll 24. The two elements 25 are likewise mounted with freedom to move on the shaft 21 by means of swivel joints 28. One of the two swivel joints 28 interlocks rigidly with a movable flange 29, which surrounds the shaft 21. At the free end of the shaft 21 is fastened another flange 30. Between the flange 29 and the flange 30 is mounted a spiral spring 31, so that any radial inward movement of the roll 26 is countered by the action of the spiral spring 31. A spacing sleeve 27 is mounted on the shaft 21 to prevent the swivel joint 26 from closing and to facilitate the insertion of the probe 1 into the tube 12.

The deflecting unit 4 comprises a cylindrical housing 40, in which there is mounted a deflecting mirror 41. The deflecting mirror 41 consists of a heavy cylindrical copper block, which has on the end facing the centering unit 2 a flange-like extension 42, which is used to fix the deflecting mirror 41 in an axial position by means of a screw cap 43. The copper block has on the end opposite the flange-like extension 42 a front surface that is mounted obliquely relative to its longitudinal axis. This front surface is coated with a reflecting layer and forms a mirror surface 44. The reflecting layer can be a dielectric coating, preferably titanium nitride (TiN), or a metallic coating, preferably vapor-deposited gold (Au). In addition, the reflecting layer can be provided with a protective layer made of quartz.

The mirror surface 44 is arranged within the probe 1 in such a manner that its normal 18 forms an angle $\beta_1$ with the longitudinal axis 10 of the probe that is greater than 45° and preferably between approximately 50° and 60°. A laser beam 58 that is propagating in the middle along the longitudinal axis 10 and impinges on the mirror surface 44 is thus deflected obliquely in a forward direction. The central ray 59 of the laser beam emerges from the housing 40 through an outlet opening 45 at an angle $\beta_2$ within the range of approximately 60° to 80° with the longitudinal axis 10. In the example of the present invention shown in FIG. 1, a hole that likewise runs obliquely relative to the longitudinal axis 10 is provided as the outlet opening 45.

The deflecting mirror 41 is also prevented from rotating within the housing 40 by a groove 46 running parallel to its longitudinal axis 10 and a pin 47 that fits into the groove 46.

The use of a heavy copper block as a deflecting mirror 41 reduces the heating of the mirror surface 44 by the laser beam 58 and extends the useful life of the reflective coating.

The housing 40 of the deflecting unit 4 is provided on the end opposite to the reflecting mirror 41 with a toothed ring 48 on its inner surface, with which there meshes a pinion 49 driven by the drive unit 8. The pinion 49 is torque-set to a flexible shaft 50, which is coupled to the drive shaft of an electric motor 81 mounted in the drive unit 8. By means of the pinion 49 that is driven by the electric motor 81, the housing 40 is put into rotation, so that the focal point F, at which the emerging laser beam 59 impinges on the inner surface of the sleeve tube 14 that is to be welded, is moved along the circumference and defines a circular path.

Between the deflecting unit 4 and the drive unit 8 is located the focusing unit 6, whose housing 60 is rigidly connected to the housing 80 of the drive unit 8. The housing 60 contains a central hole 61, into which is inserted, on the side facing the drive unit 8, a sleeve 62 to receive an optical waveguide 63. The free end of the optical waveguide 63 terminates in the hole 61 and is centered axially by the sleeve 62. The other end of the optical waveguide 63 is coupled to a laser (not shown in the drawing), preferably a solid-state laser, such as an Nd:YAG solid-state laser.

In one embodiment of the present invention, at the end of the focusing unit 6 that faces the deflecting mirror 41, there is mounted a focusing element, such as a lens 65 or a lens system, which focuses a divergent laser beam 57 which emerges from the end 64 of the optical waveguide 63. The position of the focal point F of the laser beam 59 can be adjusted by changing the distance between the end 64 of the optical waveguide and the lens 65.

The housing 40 surrounds the housing 60 in the vicinity of the lens 65 and is mounted with freedom to rotate on the housing 60 with ball bearings 66 and spacing sleeves 68 so that the housing 40 interlocks axially with the housing 60 in a rigid manner. Thus, when the pinion 49 is rotated, only the housing 40 that carries the deflecting unit 41 is put into rotation. The lens 65 and the optical waveguide 63 do not take part in this rotation.

The lens 65 is supported by several rigidly interlocking, non-rotating housing elements 60a, 60b and 60c, which extend into the interior of the housing 40. The housing elements 60b and 60c form an approximately V-shaped space 71, which is coupled in fluid communication through holes 78a with a flow channel 70 located in housing element 60c. The flow channel 70 conducts a protective shield gas, for example argon, into the space 71 located between the lens 65 and the free end 64 of the optical waveguide 63. In the flow channel 70 is inserted a reducing nozzle 77 to narrow the cross section of the channel. The shield gas flowing in the flow channel 70 above the reducing nozzle 77 enters the space 71 through the holes 78a, leaves the space 71 through additional holes 78b in the housing element 60b, exits into a ring channel 79, and from there arrives in the space 72 between the lens 65 and the deflecting mirror 41.

The shield gas, which in this manner flows around the lens 65 and past the deflecting mirror 41, leaves the probe through the outlet opening 45. By this means, not only is the welding area ventilated with shield gas, but in addition, the deflecting elements that are struck by the laser beams 57 and 58 are cooled. Furthermore, due to the outward orientation of the stream of shield gas, any precipitation of welding vapor on the deflecting mirror is prevented.

The outlet opening 45 is formed, in the example of the present invention shown in the figure, by a hole directed obliquely forward in the wall of the housing 40. By this means, the shield gas flowing through the outlet opening 45 obtains in addition an axial flow component, which helps to remove the welding vapor from the vicinity of the outlet opening 45.

The flow channel 70 is also coupled in fluid communication with a radially branching flow channel 73, which opens into a circular groove 74 of a sleeve 75 that surrounds the housing 60. The sleeve 75 forms a cylindrical extension of the probe 1. Parallel to the longitudinal axis of the probe 1, the sleeve 75 is provided with several holes 76 which are coupled in fluid communication with the circular groove 74. Through the transverse channel 73, a radial gas stream is divided off from the stream of shield gas that leaves the drive unit 8 and enters the flow channel 70. This partial stream is deflected in an axial direction into the circular groove 74 and, at the front surface of the sleeve 75, which faces the deflecting unit 4, it exits into the channel located between the tube 12 and the outer sheathing of the probe 1. This ensures that an effective atmosphere of shield gas is maintained in the vicinity of the welding area. In addition, the welding vapor that is generated during the melting is effectively conducted away from the welding point as a result of the axial flow of the shield gas, and the risk that welding vapor will be precipitated in the interior of the probe 1 is reduced.

To adjust the quantitative ratio between the stream of shield gas that flows within the probe 1 toward the deflecting mirror 41 and the stream of shield gas that is conducted radially outward, a reducing nozzle 77 inserted in the flow channel 70 is provided.

The housing 80 of the drive unit 8 is adapted to receive a slip-on hose (not shown in the drawings) on the end opposite the focusing unit 6 through which the shield gas is transported to the probe and which receives the optical waveguide 63 and the lines 82 that are required to supply electricity to the electric motor 81.

Figure 2:
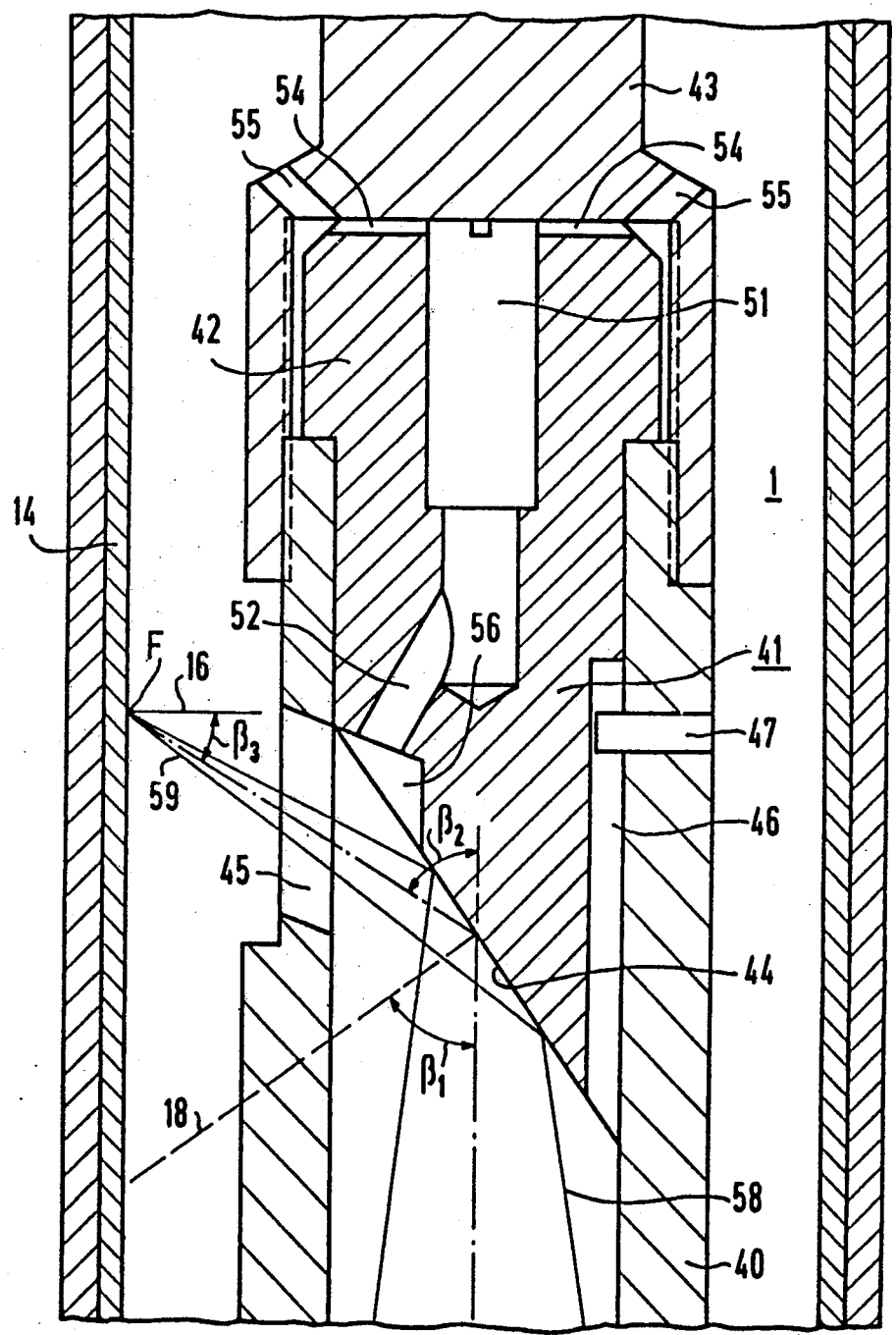
FIGS. 2, 3 and 4 each provide an enlarged section of advantageous embodiments of the probe of the present invention in the vicinity of the deflection device.

In the embodiment of the present invention according to FIG. 2, a deflecting mirror 41 is provided with a central hole 51, which leads from the flange-like extension 42 into the interior of the deflecting mirror 41 and is connected through a hole 52 that runs obliquely outwards and emerges in a recess 56 in the mirror surface 44 in the vicinity of the outlet opening 45. The flange-like extension 42 is provided on its front surface, which faces the swivel unit 43, with several radial groves 54. The radial grooves 54 form a connection between the central hole 51 and holes 55 which run obliquely outward within the swivel nut 43.

The stream of shield gas that flows along the deflecting mirror 41 within the housing 40 is thus split once again before it leaves the housing through the outlet opening 45. A partial stream of gas arrives through the hole 52 and the hole 51 of the deflecting mirror 41 and exits from the probe 1 through the holes 55 in the swivel nut 43. As a result of this stream of gas in the interior of the deflecting mirror 41, the cooling of the deflecting mirror 41 is improved and its useful life is increased.

The outlet opening 45 and the recess 56 are directly connected with one another, so that there can be no dead space that is not covered by the flow of shield gas. Dead spaces of this kind between the deflecting mirror 41 and the wall of the housing in which the outlet opening 45 is located would, in fact, lead to turbulence and thus an increase in the precipitation of welding material on the reflecting surface 44.

It may also be seen from FIG. 2 that the laser beam 59 emerging from the probe 1 hits the focal point F obliquely relative to the inner surface of the tube 14. Between the normal extending from the focal point F to the inner surface of the tube 14 and the central ray of the emerging laser beam 59 an angle $\beta_3$ is formed, as shown in FIG. 2, which is preferably between approximately 10° and 30°.

Figure 3:
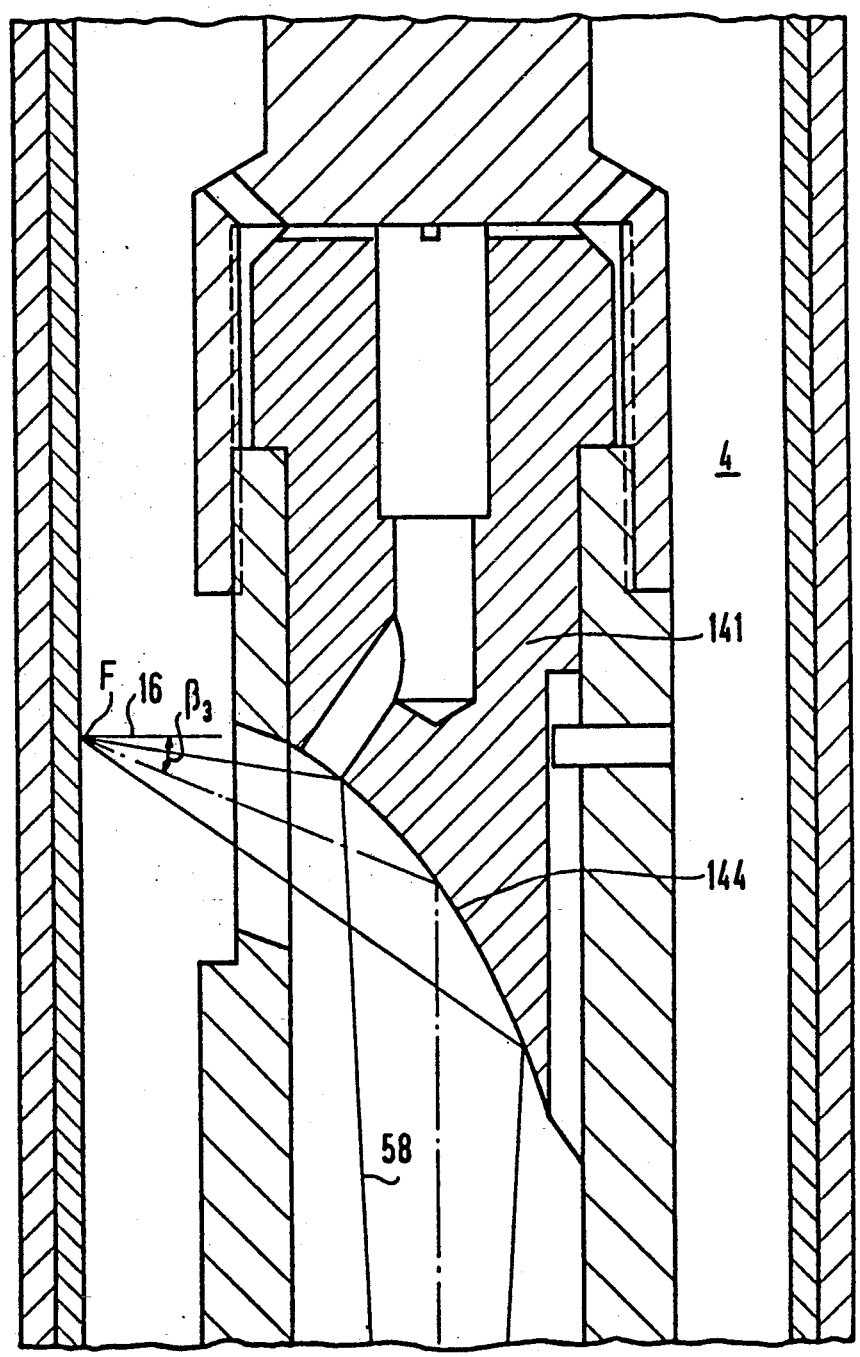

It should be pointed out that different means for focusing and deflecting the laser beam which perform the functions of focusing and deflecting in substantially different ways in comparison to each other can be employed in the process and device of the present invention. Accordingly, in the embodiment of the present invention illustrated in FIG. 3, there is provided in the deflecting unit 4 a deflecting mirror 141, whose deflecting surface 144 is concave. In this embodiment of the present invention, rather than initially focus the diverging laser beam with a lens and then deflect the focused laser beam with a flat mirror, as described above in relation to the embodiments of FIGS. 1 and 2, the concave deflecting surface simultaneously focuses and deflects the laser beam onto the surface of the sleeve tube 14 to be welded. The deflecting mirror 141 therefore serves both to deflect the laser beam 58 that is propagated within the probe 1 and to focus this laser beam 58 on a focal point F lying outside the probe. As shown in FIG. 3, the laser beam is simultaneously focused and deflected obliquely forward relative to the longitudinal axis 10 of the probe. The normal 16 to the focal point F thus forms an angle $\beta_3$ relative to the central ray of the laser beam, which is preferably between approximately 10° and 30°.

Thus, one advantage of this embodiment of the present invention, is that a lens arrangement to focus the laser beam emerging from the optical waveguide is no longer necessary. Another advantage is that the cross-sectional area of the laser beam impinging on the deflecting mirror is typically increased in comparison to the embodiments described above employing a flat deflecting mirror. As a result, the radiation intensity impinging on the deflecting mirror per unit area of the mirror surface is reduced and, accordingly, the local heating of the deflecting mirror is correspondingly reduced.

Figure 4:
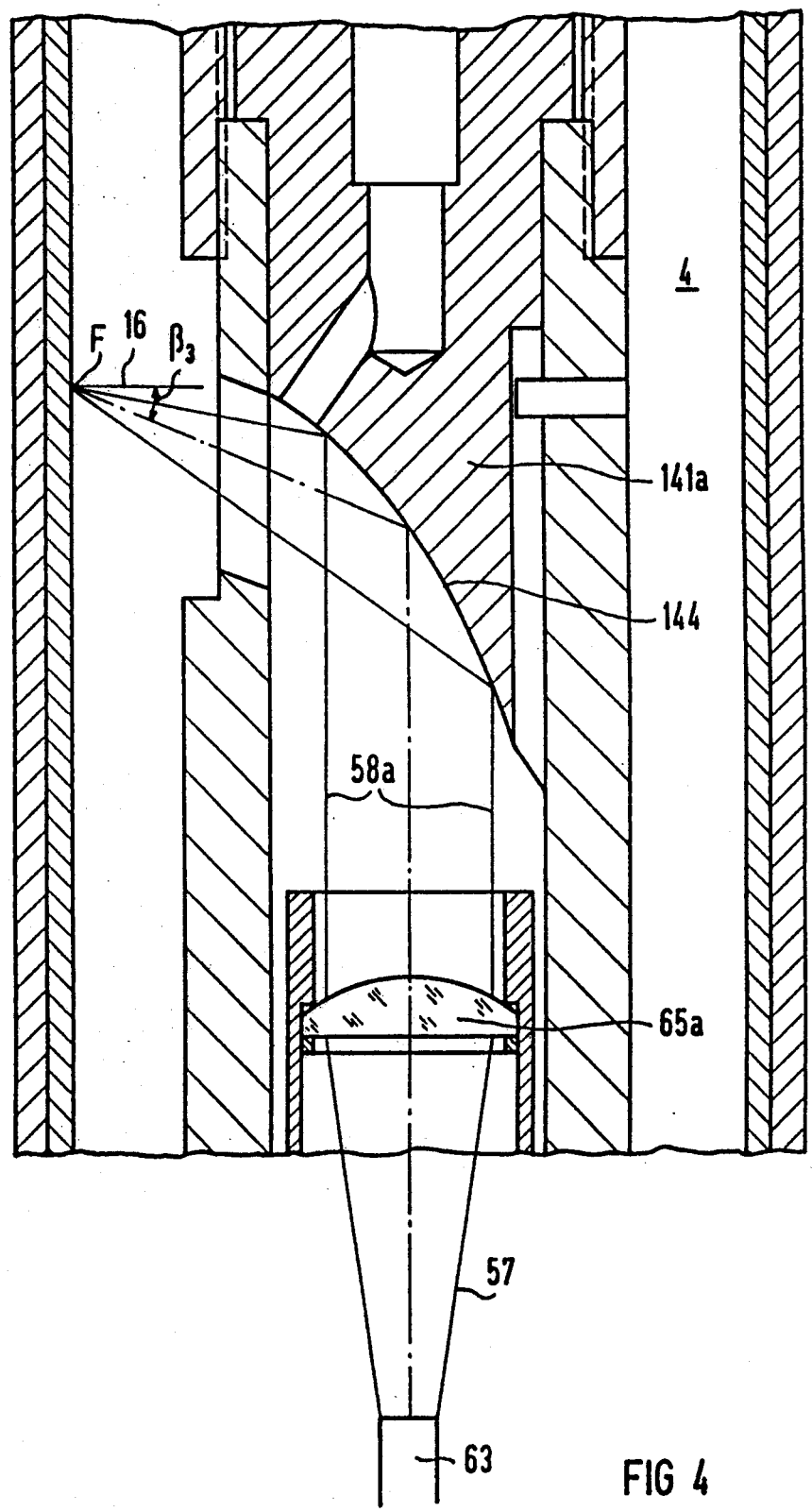

As shown in FIG. 4, a collimator lens 65a can be mounted in front of a concave deflecting mirror 141a in accordance with another embodiment of the present invention. The collimator lens 65a collimates a laser beam 57 emerging from the optical waveguide 63, to a parallel beam 58a, which is then focused and deflected by the deflecting mirror 141a. The collimator lens 65a permits a greater distance between the optical waveguide 63 and the deflecting mirror 141a, while maintaining the same distance from the focal point F to the deflecting mirror 141a.

Thus, as will be recognized by those skilled in the art, although the embodiments of FIGS. 1 and 2, which employ a flat mirror surface and a focusing lens, perform the functions of focusing and deflecting the laser beam in a substantially different way in comparison to the embodiments of FIGS. 3 and 4, which employ a concave mirror to simultaneously focus and deflect the laser beam, both systems can be used in the device and process of the present invention.

What is claimed is:

1. A device for laser welding a tube, comprising:
a deflecting member for deflecting a laser beam transmitted within the device onto a surface of the tube upon insertion of the device into the tube, the device defining an outlet opening for permitting the laser beam to pass through the outlet opening upon deflection by the deflecting member onto the surface of the tube for welding the surface of the tube;
first means mounted within the device for transmitting a first stream of gas to the outlet opening so that the gas flows out of the device through the outlet opening; and
second means for transmitting a second stream of gas between the device and the tube upstream of the outlet opening so that the second stream of gas flows between the device and the tube in the vicinity of the outlet opening.

2. A device as defined in claim 1, further comprising third means for adjusting the quantitative ratio of the first and second streams of gas.

3. A device as defined in claim 2, wherein the third means includes a reducing nozzle for receiving the first stream of gas and controlling the flow rate of the first stream of gas.

4. A device as defined in claim 1, wherein the second means includes a sleeve member coupled to the device and defining a flow channel for receiving the second stream of gas for directing the second stream of gas between the device and the tube.

5. A device as defined in claim 4, wherein the sleeve member defines at least one aperture coupled in fluid communication with the flow channel for directing the second stream of gas through the at least one aperture and between the device and the tube substantially in the direction of the outlet opening.

6. A device as defined in claim 1, further comprising fourth means for directing a portion of the first stream of gas into a third stream of gas prior to entry of the first stream of gas through the outlet opening for directing the third stream of gas between the device and the tube downstream of the outlet opening.

7. A device as defined in claim 6, wherein the fourth means includes at least one flow channel within the device and located adjacent to the deflecting member for directing the third stream through the flow channel to cool the deflecting member.

8. A device as defined in claim 7, wherein the fourth means further includes a recess formed within the deflecting member and located substantially opposite the outlet opening, the recess being coupled in fluid communication with the flow channel for directing the third stream through the recess into the flow channel.

9. A device as defined in claim 1, wherein the deflecting member deflects the laser beam at an oblique angle relative to the longitudinal axis of the device onto the surface of the tube.

10. A device as defined in claim 9, wherein the deflected laser beam is oriented at an angle within the range of approximately 60° to 80° relative to the longitudinal axis of the device.

11. A device as defined in claim 1, further comprising a focusing lens for focusing the laser beam onto the surface of the tube.

12. A device as defined in claim 11, wherein the focusing lens focuses the laser beam and the deflecting member deflects the laser beam focused by the focusing lens onto the surface of the tube.

13. A device as defined in claim 1, wherein the deflecting member defines a curved surface for deflecting and focusing the laser beam onto the surface of the tube.

14. A device as defined in claim 13, wherein the curved surface is substantially concave shaped.

15. A device as defined in claim 13, further comprising means for collimating the laser beam into a substantially parallel beam prior to the focusing and deflection of the laser beam by the curved surface onto the surface of the tube.

16. A device as defined in claim 15, wherein the means for collimating includes a collimator lens for forming a parallel laser beam prior to the focusing and deflection of the laser beam by the curved surface onto the surface of the tube.

17. A device as defined in claim 11, wherein the deflecting member defines a substantially flat deflecting surface for deflecting the laser beam onto the surface of the tube, and the normal to the flat deflecting surface is oriented at an oblique angle relative to the longitudinal axis of the device.

18. A device as defined in claim 17, wherein the angle of the normal to the deflecting surface relative to the longitudinal axis of the device is within the range of approximately 50° to 60°.

19. A device as defined in claim 13, wherein the curved surface deflects an approximate central ray of the laser beam onto the surface of the tube at an oblique angle relative to the longitudinal axis of the device.

20. A device as defined in claim 19, wherein the oblique angle is within the range of approximately 50° and 60°.

21. A device as defined in claim 1, wherein the deflecting member is made of a material exhibiting a high heat conductivity.

22. A device as defined in claim 1, wherein the deflecting member defines a deflecting surface including a layer of vapor-deposited gold for deflecting the laser beam.

23. A device as defined in claim 1, wherein the outlet opening imparts an axially directed flow component to the first stream of protective gas flowing through the outlet opening.

24. A device as defined in claim 1, wherein the second means transmits the second stream of gas between the device and the tube upstream of the outlet opening so that the second stream flows between the tube and the device past the outlet opening.

25. A device as defined in claim 1, wherein the first and second streams of gas are divided from a common stream of gas flowing into the device.

26. A process for laser welding a tube, comprising the steps of:

inserting a welding unit into the tube;
transmitting a laser beam within the welding unit in a direction substantially parallel to the longitudinal axis of the welding unit;
deflecting the laser beam away from the longitudinal axis of the welding unit and through an outlet opening of the welding unit onto a surface of the tube to be welded;
directing a first stream of gas through the outlet opening of the welding unit; and
directing a second stream of gas into the space between the tube and the welding unit upstream of the outlet opening.

27. A process as defined in claim 26, further comprising the steps of directing a common stream of gas into the welding unit and separating the common stream of gas into the first and second streams of gas.

28. A process as defined in claim 27, comprising the additional steps of dividing the first stream of gas into a third stream of gas and directing the third stream of gas in a direction substantially parallel to the longitudinal axis of the welding unit downstream of the outlet opening of the welding unit.

29. A process as defined in claim 28, wherein the third stream of gas is further directed out of the welding unit into the space between the tube and the welding unit.

30. A process as defined in claim 26, wherein the laser beam is deflected onto the surface of the tube at an oblique angle relative to the longitudinal axis of the welding unit.

31. A process as defined in claim 26, wherein the laser beam is generated by a solid-state laser operating in the cw mode.

32. A process as defined in claim 26, wherein the laser beam is both focused and deflected by a curved deflecting surface within the welding unit.

33. A process as defined in claim 32, wherein the curved deflecting surface is substantially concave shaped.

34. A process as defined in claim 32, comprising the additional step of collimating the laser beam into a substantially parallel beam prior to the focusing and deflection of the laser beam.

35. A process as defined in claim 34, wherein a collimating lens is used to collimate the laser beam within the welding unit.

36. A process as defined in claim 26, wherein the laser beam is initially focused and then the focused laser beam is deflected onto the surface of the tube.

37. A process as defined in claim 36, wherein the laser beam is focused by a focusing lens within the welding unit and then deflected through the outlet opening by a substantially flat deflecting surface within the welding unit.

38. A process as defined in claim 30, wherein the angle is between approximately 60° and 80°.

39. A process as defined in claim 26, comprising the additional step of inserting a sleeve tube within the tube and welding the sleeve tube to the tube to repair weld the tube.

* * * * *